United States Patent

Weber

Patent Number: 6,067,788
Date of Patent: May 30, 2000

[54] CHAIN LINK AND ENERGY-CONVEYING CHAIN WITH LOCKABLE CROSS BEAM

[75] Inventor: Willibald Weber, Netphen, Germany

[73] Assignee: Kabelschlepp GmbH, Siegen, Germany

[21] Appl. No.: 09/254,965

[22] Filed: Mar. 16, 1999

[30] Foreign Application Priority Data

Nov. 4, 1996 [DE] Germany ............... 196 45 403

[51] Int. Cl.[7] .................................................. F16G 13/16
[52] U.S. Cl. ............................... 59/78.1; 59/900; 248/49
[58] Field of Search ..................... 59/78.1, 900; 248/49

[56] References Cited

U.S. PATENT DOCUMENTS

| | | | |
|---|---|---|---|
| 4,590,961 | 5/1986 | Schumann | 59/78.1 |
| 5,157,913 | 10/1992 | Wehler et al. | |
| 5,184,454 | 2/1993 | Klein et al. | 59/78.1 |
| 5,881,548 | 3/1999 | Takahashi et al. | 59/78.1 |

OTHER PUBLICATIONS

Dipl. Ing. Gunter Erhard, Ing. (grad) Erich Strickle, "Maschinenelemente Aus Thermoplastischen Kunststoffen" ["Machine Element of Thermoplastic Plastics"], vol. 2, *Bearings and Drive Elements*, VDI–Verlag GmbH, Dusseldorf, Germany, 1978, pp. 255–256.

*Primary Examiner*—David Jones
*Attorney, Agent, or Firm*—Alston & Bird LLP

[57] ABSTRACT

The subject of the invention relates to a chain link for an energy guide chain. The chain link has two spaced-apart, mutually oppositely disposed chain side plates (2) and at least one transverse portion (5). The transverse portion (5) has at both ends a releasable hinge (10) which can be connected to the chain side plate (2). The transverse portion (5) is lockable to the chain side plate (2). For the purposes of latching the transverse portion (5) to the chain side plate (2) the hinge (10) has a pivot pin (7) and a recess (15) which cooperates with the pivot pin (7) and which has undercut configurations (14). The pivot pin (7) has a latching projection (9) engaging into an opening (16). The opening (16) extends over a part of the periphery of the recess (15).

11 Claims, 3 Drawing Sheets

CHAIN LINK AND ENERGY-CONVEYING CHAIN WITH LOCKABLE CROSS BEAM

BACKGROUND OF THE INVENTION

The invention relates to a chain link for an energy guide chain with chain links with at least one latchable transverse portion.

DE 43 13 075 A1 discloses a chain link for an energy guide chain, which chain link has two spaced-apart, mutually oppositely disposed chain side plates. The chain side plates are connected together by a transverse portion. The connection between the transverse portion and the side plates is effected by means of releasable hinges. The transverse portion is latchable to the chain side plates. For that purpose the transverse portion in accordance with DE 43 13 074 A1 has latching means which co-operate with corresponding latching means on the chain side plates. More specifically DE 43 13 075 A1 proposes that the transverse portions have at both ends respective projections which are connected to mounting pins of round cross-section. The chain side plates have slots for receiving the projections. In the region of the slots the side plates have mounting recesses for latchingly receiving and guiding the mounting pins. That configuration of the hinges permits a pivotal movement of the transverse portion through 180°, while the transverse portion is removable in any desired pivotal position.

A further embodiment of a chain link for an energy guide chain is known from DE 33 18 565 C2. The chain link has two spaced-apart, mutually oppositely disposed chain side plates which can be connected together by way of a fastening loop member. The fastening loop member is pivotably mounted to one chain side plate by a releasable hinge and it is lockable to the other chain side plate with an elastic hook. In regard to the design configuration of the hinge DE 33 18 365 C2 proposes that it comprises a pivot portion which is formed in an exposed condition in the free edge of a chain side plate and which is of a circular cross-section that is flattened off perpendicularly to the chain side plates, the pivot portion having rounded-off narrow sides, the hinge further comprising cut, part-circular recesses which are shaped into the end of the fastening loop member and which are provided with portions of an undercut configuration. That configuration for the fastening loop member affords the possibility that, after the fastening loop member has been fitted onto the pivot portion and after pivotal movement towards the oppositely disposed chain side plate the fastening loop member is force-lockingly and positively lockingly braced to the pivot portion. A fastening loop member of that kind is pivotal at one end.

An object of the present invention is to provide a chain link for an energy guide chain, in which a transverse portion which can connect the chain side plates is pivotable both about the one chain side plate and also about the other, wherein latchability of the transverse portion to a chain side plate at least at one side is to be possible. A further object of the invention is to provide an energy guide chain in which it is possible to introduce and remove supply lines.

SUMMARY OF THE INVENTION

The chain link according to the invention for an energy guide chain has two spaced-apart, mutually oppositely disposed chain side plates. The chain link also has at least one transverse portion, also referred to herein as a transverse member. At least one of the transverse portions can be connected at both ends to the chain side plates by means of a releasable hinge. The transverse portion is latchable to at least one chain side plate. For the purposes of latching the transverse portion to at least one chain side plate, it is proposed that at least one hinge is formed by a pivot pin and a recess co-operating with the pivot pin. The recess has undercut configurations. The pivot pin of the hinge has at least one latching projection which engages into an opening. The latching projection engages into the opening which extends at least over a part of the periphery of the recess. The chain link according to the invention thus has at least one hinge which performs two functions. On the one hand the hinge forms a pivotal connection between the transverse portion and a chain side plate and on the other hand the hinge forms a latching connection between the transverse portion and a chain side plate. In that arrangement, the dual functionality is achieved using simple means by structural redesigns of the functionally operative components of a hinge. The hinge integrates both the pivotal and also the latching connection between the transverse portion and the chain side plate. The fact that the latching projection is provided on the pivot pin means that there is no need for additional aids which ensure a latching connection between the transverse portion and the chain side plate. That also applies in regard to the provision of the recess with an opening.

In accordance with an advantageous embodiment of the chain link it is proposed that the pivot pin of each hinge is provided on the chain side plate and the recess is provided on the transverse portion. In that arrangement the pivot pin is provided in an exposed condition on the chain side plate. In that case the chain side plate with the pivot pin is preferably produced in one piece from plastics material, in particular a fibre-reinforced plastics material.

In order to simplify the latching connection between the transverse portion and the chain side plate or plates, it is proposed that the recess forms an aperture having a tool engagement region. The tool engagement region can be of a trapezoidal configuration so that for example the tip of a screwdriver can be introduced into the tool engagement region and the transverse portion can be released from the chain side plate by exerting a force, with the tool such as for example a screwdriver being supported on the pivot pin.

In accordance with a particularly advantageous embodiment of the chain link according to the invention it is proposed that the latching projection extends only over a part of the length of the pivot pin. That configuration has the advantage that the latching connection on the one hand is sufficiently strong to prevent unintentional opening of the transverse portion but on the other hand it can be released by the application of a relatively low force.

In that respect a symmetrical configuration of the latching projection with respect to a center line of the pivot pin is preferred.

The pivot pin is preferably of a substantially circular cross-section. The recess into which the pivot pin engages is of an inside contour which is matched to the outside contour of the pivot pin.

In accordance with another concept of the invention there is proposed an energy guide chain for guiding supply lines having a number of pivotably interconnected chain links, wherein each chain link has two spaced-apart, mutually oppositely disposed chain side plates and at least one transverse portion. At least one transverse portion can be connected at both ends to the chain side plates by a releasable hinge. The transverse portion is latchable to at least one chain side plate of the two chain side plates. For latching purposes at least one hinge is so designed that it is formed by a pivot pin and a recess which cooperates with the pivot pin and which has undercut configurations. The pivot pin has at least one latching projection engaging into an opening. The opening extends at least over a part of the periphery of the recess.

BRIEF DESCRIPTION OF THE DRAWINGS

Further advantages and details of the chain link according to the invention are described with reference to an embodiment illustrated in the drawing in which.

DETAILED DESCRIPTION OF THE PREFERRED EMBODIMENTS

Figure 1:
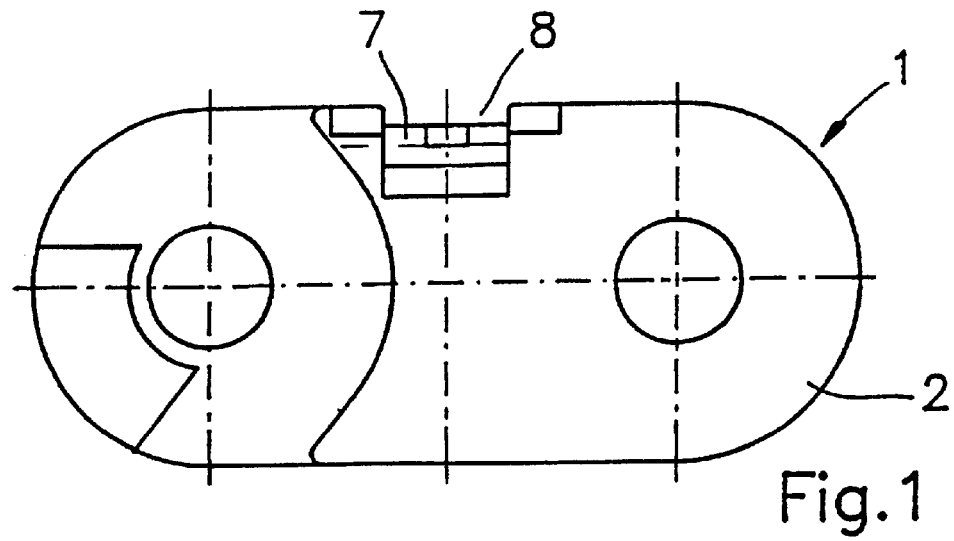
FIG. 1 is a front view of a chain link.
Figure 2:
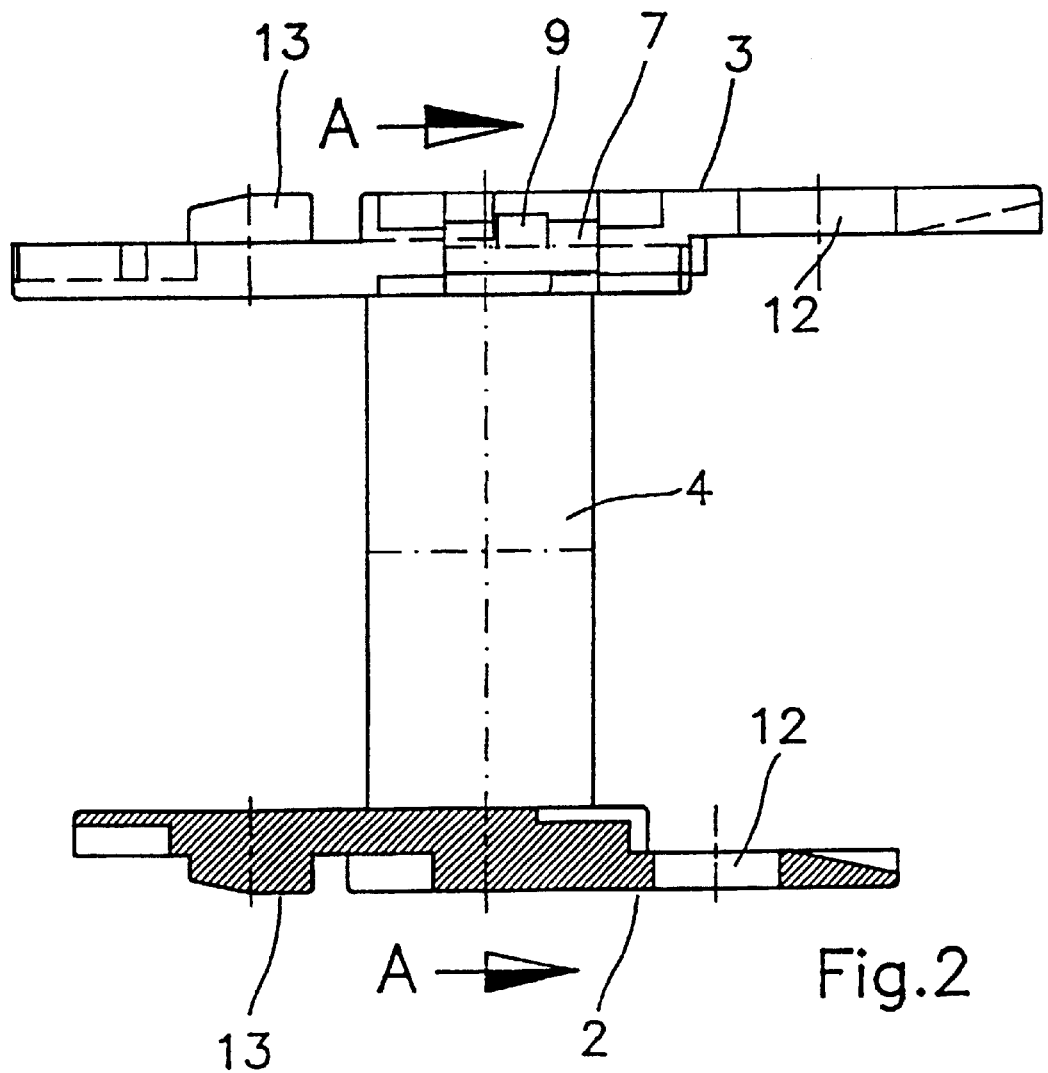
FIG. 2 is a partly sectional plan view of the chain link shown in FIG. 1
Figure 3:
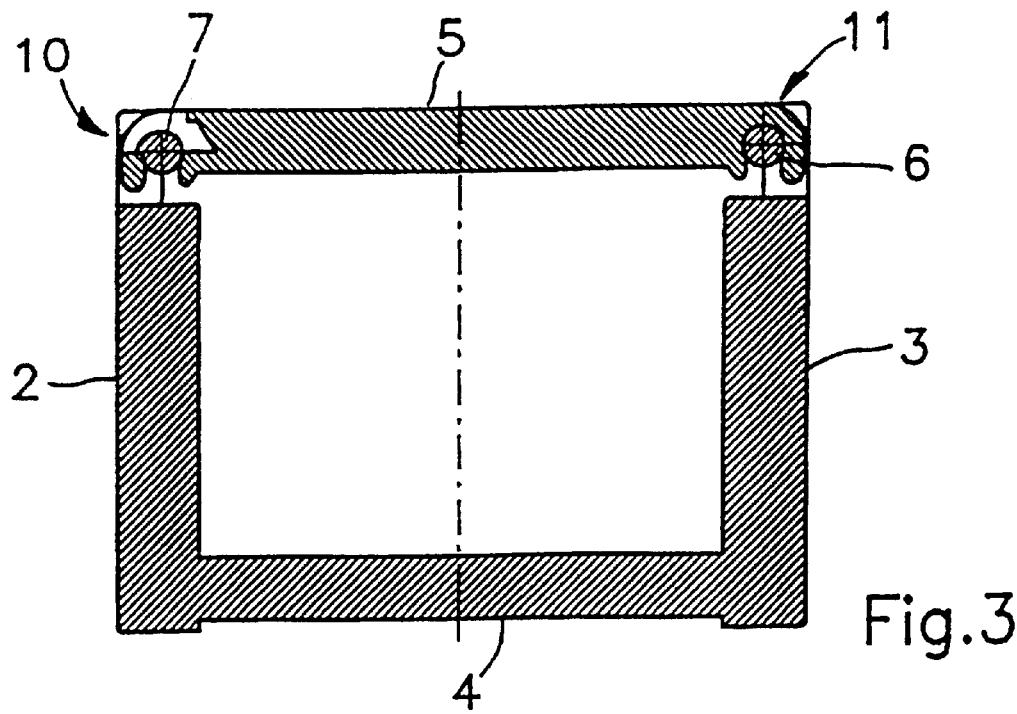
FIG. 3 is a view in section through the chain link taken along section line A—A with a transverse portion.
Figure 4:
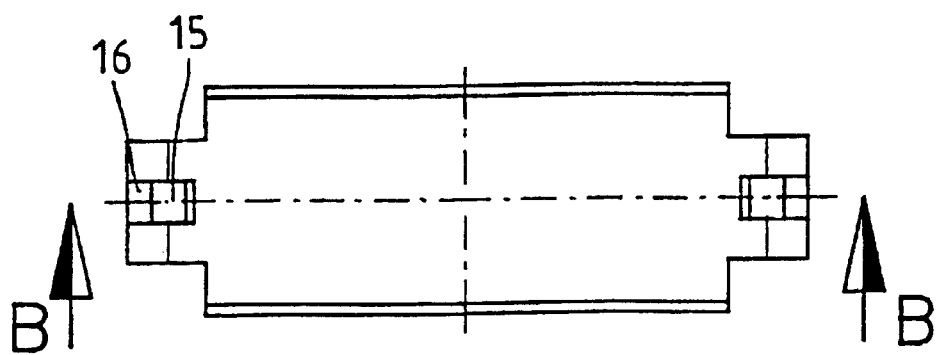
FIG. 4 is a plan view of a transverse portion.
Figure 5:
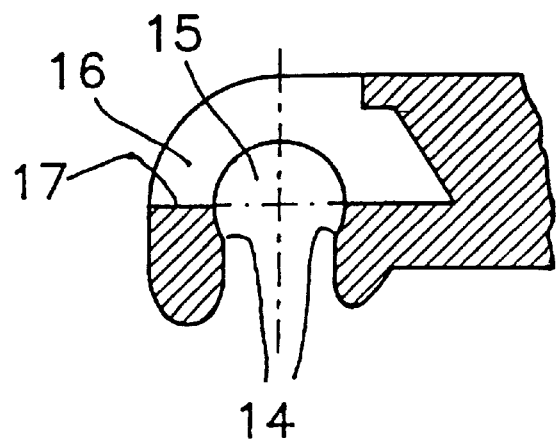
FIG. 5 is a view in section taken along B—B in FIG. 4, FIGS. 6 and 7 show a hinge on an enlarged scale.

A chain link 1 is shown in FIGS. 1, 2 and 3. The chain link 1 includes two spaced-apart, mutually oppositely disposed chain side plates 2, 3. Each chain side plate 2, 3 has a pivot bore 12 and a pivotal connecting portion 13. The pivot bore 12 of each chain side plate 2, 3 is of such a configuration that a pivotal connecting portion 13 of an adjacent chain link can be inserted into same. The chain side plates 2, 3 are connected together by a transverse web 4. The chain side plates 2, 3 and the transverse web 4 can be of an integral structure.

Each chain side plate 2, 3 has a cut-out 8 in which a pivot pin 6, 7 is provided. The pivot pin 7 has a latching projection 9 which extends only over a part of the length of the pivot pin 7. In the illustrated embodiment the pivot pin 6 does not have a latching projection 9.

As can be seen in particular from FIG. 3 the side plates 2, 3 are connected together by way of a transverse portion 5. The transverse portion 5 is connected at both ends to the respective chain side plates 2 and 3 respectively by releasable hinges 10 and 11. The hinge 10 is formed by the pivot pin 7 with a latching projection 9 and a recess 15 which cooperates with the pivot pin 7 and which has undercut configurations 14. The recess 15 has an opening 16 into which the latching projection 9 engages. The opening 16 has an abutment surface 17 against which an abutment 18 can be caused to bear. The latching projection 9 and the opening 16 are of such a configuration relative to each other that a pivotal movement of the transverse portion 5 is possible, while release of the connection between the transverse portion 5 and the chain side plate 2 is possible only by applying a force.

Figure 6:
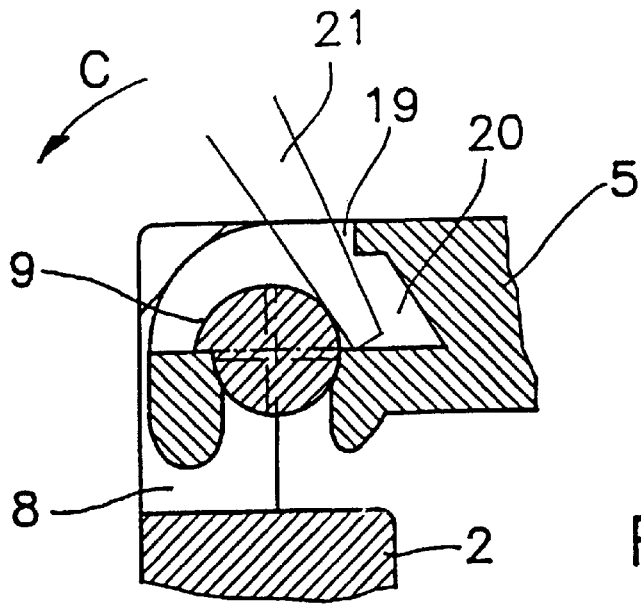

In order to release the transverse portion 5 from the chain side plate 2 the opening 16 has an aperture 19 having a tool engagement region 20, as can be seen in particular from FIG. 6. By introducing a tool 21 into the aperture 19 and the tool engagement region 20 the transverse portion 5 can be released from the chain side plate 2 by a movement of the tool 21 in the direction indicated by the arrow C.

Figure 7:
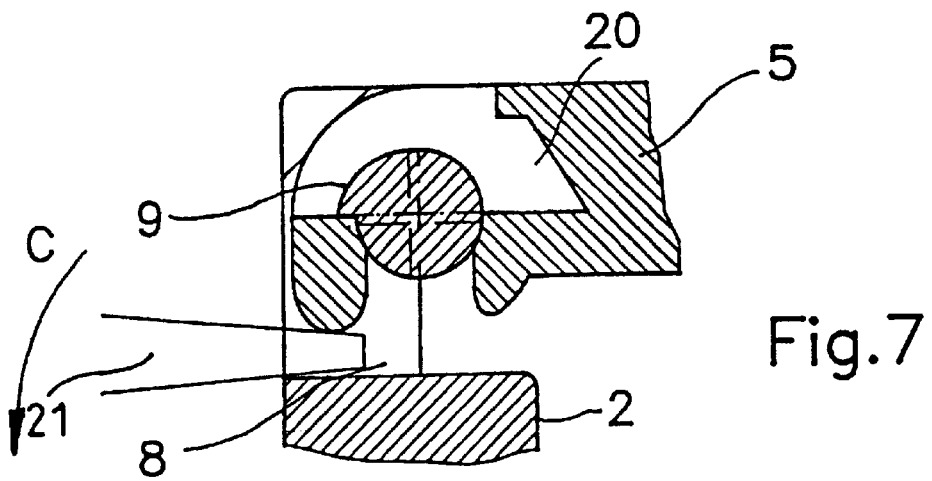
Figure 8:
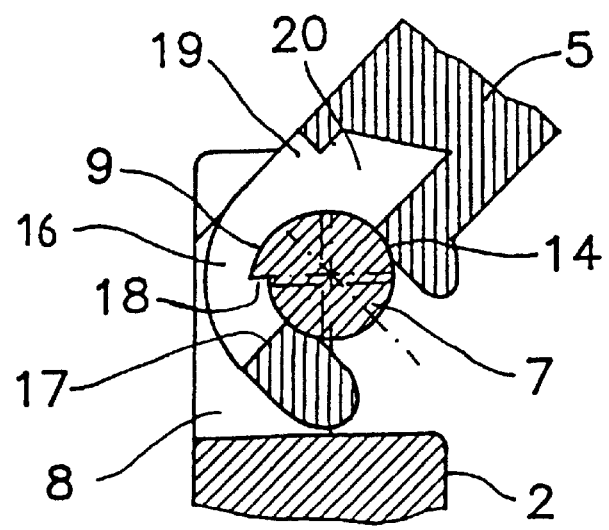
FIG. 8 shows the hinge of FIGS. 6 and 7 with a pivoted transverse portion.

A further possible way of releasing the transverse portion 5 from the chain side plate 2 is shown in FIG. 7. A tool 21 is introduced into the cut-out 8, between an end part of the transverse portion 5 and the chain side plate 2. The trans-verse portion 5 is released from the pivot pin 7 by the lever action of the tool 21.

The hinge 10 provided between the transverse portion 5 and the chain side plate 2 may also be provided between the transverse portion 5 and the chain side plate 3.

I claim:

1. A chain link for an energy guide chain comprising;

two spaced apart side plates, at least one transverse member extending transversely between the two side plates and having opposite ends which are connected to the respective side plates by means of a releasable connection, at least one of the releasable connections including a pivot pin and a recess receiving the pivot pin and which includes undercut portions which partially embrace the pivot pin, and wherein the pivot pin has at least one latching projection extending into an opening which extends over at least a part of the periphery of the recess, whereby the one releasable connection permits the recess to be latched about the pivot pin, with the transverse member then being pivotable about the axis of the pivot pin.

2. A chain link according to claim 1 wherein the pivot pin of the one releasable connection is provided on the associated chain side plate and the recess is provided on the transverse member.

3. A chain link according to claim 2 wherein the opening extends through the transverse member and defines a tool engagement region.

4. A chain link according to claim 1, wherein the latching projection extends over only a part of the length of the pivot pin.

5. A chain link according to claim 4 wherein the latching projection is of a symmetrical configuration with respect to a center line of the pivot pin.

6. A chain link according to claim 1 wherein the pivot pin is of a substantially circular cross-section.

7. The chain link according to claim 6 wherein the latching projection includes a substantially radial shoulder when the pivot pin is viewed in cross-section.

8. The chain link according to claim 7 wherein the opening includes an abutment surface which is positioned to be engaged by said shoulder of said pivot pin when the opposite ends of the transverse member are connected to the respective side plates.

9. The chain link according to claim 1 wherein the two side plates are fixedly interconnected by means of a transverse web so as to define a U-shaped receiving part, and wherein the one transverse member is disposed parallel to and spaced above said transverse web.

10. The chain link according to claim 9 wherein said side plates define a longitudinal direction along the length thereof, and wherein the pivot pin of the one releasable connection defines a central axis which extends in the longitudinal direction.

11. A chain for supporting energy conduits from an attachment point to a moveable consuming load, comprising a plurality of chain links, with each chain link comprising a U-shaped receiving part which includes two spaced apart side plates, and at least one transverse member extending transversely between the two side plates and having opposite ends which are connected to the respective side plates by means of a releasable connection, said plurality of chain links being serially arranged with adjacent chain links being pivotally connected to each other, at least one of the releasable connections of each chain link including a pivot pin and a recess receiving the pivot pin and which includes undercut portions which partly embrace the pivot pin, and wherein the pivot pin has at least one latching projection extending into an opening which extends over at least a part of the periphery of the recess, whereby the one releasable connection permits the recess to be latched about the pivot pin, with the transverse member then being pivotable about the axis of the pivot pin.

* * * * *

UNITED STATES PATENT AND TRADEMARK OFFICE
CERTIFICATE OF CORRECTION

PATENT NO. : 6,067,788
DATED : May 30, 2000
INVENTOR(S) : Weber

It is certified that error appears in the above-identified patent and that said Letters Patent is hereby corrected as shown below:

Title page,
Cancel "[22] filed: Mar. 16, 1999", and insert the following:

-- [22] PCT Filed: Oct 14, 1997

| [86] PCT No.: | PCT/EP97/05640 |
|---|---|
| § 371 Date: | March 16, 1999 |
| § 102(e) Date: | March 16, 1999 |
| [87] PCT Pub. No.: | WO/98/20265 |
| PCT Pub. Date: | May 14, 1998 --. |

Item [56] References Cited, insert the following:
-- FOREIGN PATENT DOCUMENTS
| 43 13 075 | 11/1994 | Germany |
| 0 126 862 | 12/1984 | European Patent Office |
| 0 499 809 | 08/1992 | European Patent Office |
| 33 18 365 | 11/1984 | Germany --. |

Column 1,
Lines 16, 17, "DE 43 13 074" should read -- DE 43 13 075 --;
Line 29, "DE 33 18 565" should read -- DE 33 18 365 --.

Signed and Sealed this

Eighteenth Day of September, 2001

Attest:

NICHOLAS P. GODICI
*Attesting Officer*   *Acting Director of the United States Patent and Trademark Office*